United States Patent
Cheng et al.

(10) Patent No.: US 7,160,043 B2
(45) Date of Patent: Jan. 9, 2007

(54) KEYBOARD HAVING LIGHTING DEVICE

(76) Inventors: Wen Lung Cheng, P.O.Box 10-69, Chong Ho, Taipei (TW) 235; Yung Chin Pan, P.O.Box 10-69, Chong Ho, Taipei (TW) 235

( * ) Notice: Subject to any disclaimer, the term of this patent is extended or adjusted under 35 U.S.C. 154(b) by 381 days.

(21) Appl. No.: 10/805,544

(22) Filed: Mar. 17, 2004

(65) Prior Publication Data
US 2005/0204899 A1 Sep. 22, 2005

(51) Int. Cl.
*B41J 5/08* (2006.01)
*G06F 3/023* (2006.01)

(52) U.S. Cl. .............. 400/472; 400/473; 200/314; 200/310

(58) Field of Classification Search .............. None
See application file for complete search history.

(56) References Cited

U.S. PATENT DOCUMENTS

| 3,934,104 A | * | 1/1976 | Stout | 200/532 |
| 5,212,356 A | * | 5/1993 | English | 200/5 A |
| 5,936,554 A | * | 8/1999 | Stanek | 341/22 |
| 6,797,902 B1 | * | 9/2004 | Farage et al. | 200/314 |

* cited by examiner

Primary Examiner—Daniel J. Colilla
Assistant Examiner—Marissa Ferguson-Samreth

(57) ABSTRACT

A keyboard includes a housing having a number of cavities to slidably receive shanks of a number of key pads, and a light device for lighting the key pads. The lighting device includes a number of light members engaged in the shanks of the key pads, the housing includes two conductive projections extended into each of the cavities to selectively engage with terminals of the light members, and to energize the light members when the key pads are depressed by the users. A spring biasing device may bias the key pad to disengage the terminals of the light members from the conductive projections.

3 Claims, 9 Drawing Sheets

KEYBOARD HAVING LIGHTING DEVICE

BACKGROUND OF THE INVENTION

1. Field of the Invention

The present invention relates to a keyboard, and more particularly to a keyboard having a lighting device to indicate the depressions or actuations of key pads.

2. Description of the Prior Art

Typical keyboards comprise a number of key pads slidably received in a number of cavities of a housing, and to be depressed or actuated by users, to enter information or controlling signals into computer facilities or the like.

Normally, the typical keyboards do not have any lighting devices to indicate whether the key pads have been suitably depressed or actuated by the users or not, when the key pads are actuated or depressed by the users, or the like, such that the users may feel boring while working with such keyboards.

The present invention has arisen to mitigate and/or obviate the afore-described disadvantages of the conventional keyboards.

SUMMARY OF THE INVENTION

The primary objective of the present invention is to provide a keyboard including a lighting device to indicate the depressions or actuations of key pads of keyboards.

In accordance with one aspect of the invention, there is provided a keyboard comprising a housing including a plurality of cavities formed therein, a plurality of key pads each including a shank slidably received in the cavities of the housing respectively, and a lighting device for lighting the key pads.

The lighting device includes a plurality of light members engaged in the shanks of the key pads respectively, and to be actuated or energized when the key pads are depressed or actuated by the users, for example. The housing includes two conductive projections extended into each of the cavities thereof respectively, and each of the light members includes two terminals to selectively coupled to the projections of the housing.

The housing includes two conductors attached to each of the cavities thereof, and the conductors includes the conductive projections extended therefrom and extended into each of the cavities of the housing respectively. The housing includes two walls to define each of the cavities thereof, the conductive projections of the conductors are extended through the walls of the housing and extended into each of the cavities of the housing respectively for engaging with the terminals of the light members.

Each of the key pads includes two grooves formed therein to slidably receive the conductive projections of the conductors respectively. Each of the key pads includes a plurality of ribs extended therefrom to form or define the grooves thereof and thus to slidably receive the conductive projections of the conductors respectively.

A limiting device may further be provided for limiting a sliding movement of the key pad relative to the housing, and includes at least one jut extended into each of the cavities of the housing, and at least one stop extended from each of the key pads and engageable with the jut of the housing, to limit the sliding movement of the key pad relative to the housing.

Each of the key pads includes at least one channel formed therein to slidably receive the jut of the housing. Each of the key pads includes a plurality of ribs extended therefrom to define the channel thereof.

A spring biasing device may further be provided for biasing the key pad to move relative to the housing, and includes a plurality of spring biasing members disposed in the housing and aligned with the key pads respectively, to bias the key pad to move relative to the housing.

The housing includes a plurality of chambers formed therein, and each of the spring biasing members includes a peripheral panel received in the chambers of the housing respectively. Each of the spring biasing members includes an upper panel, and a protrusion extended from the upper panel thereof for engaging with the key pads respectively.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
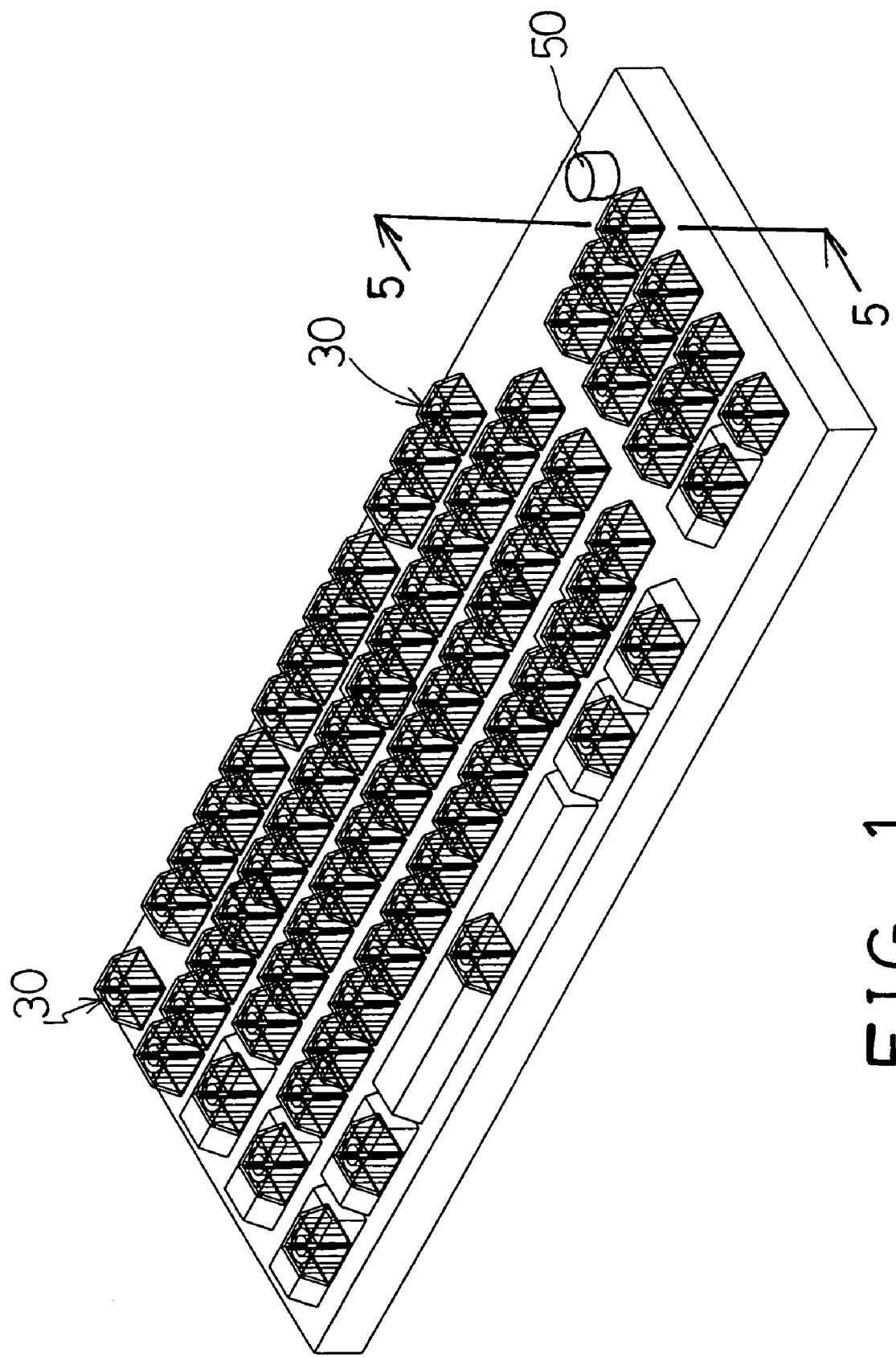
FIG. 1 is a perspective view of a keyboard in accordance with the present invention.
Figure 2:
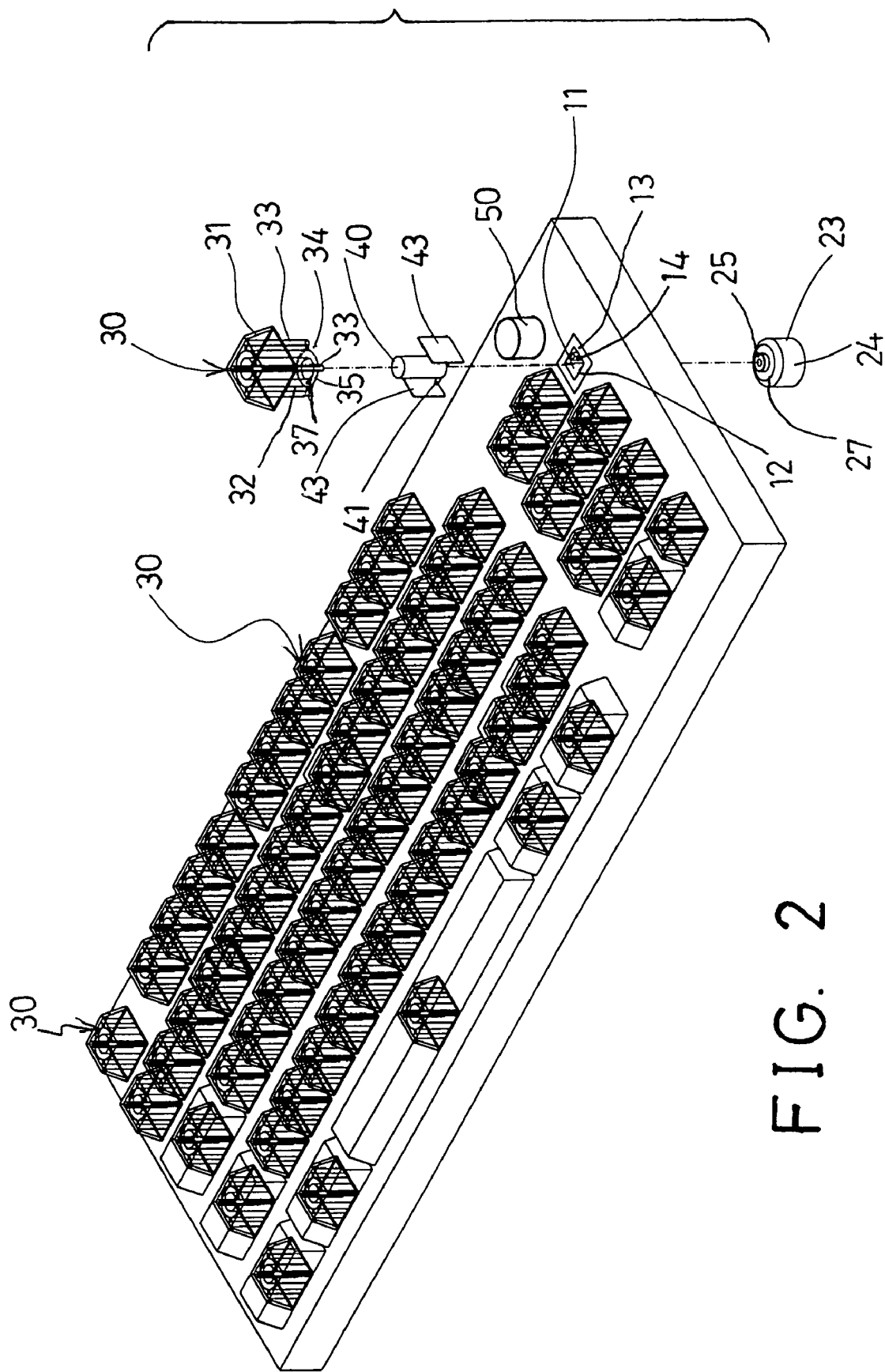
FIG. 2 is a partial exploded view of the keyboard.

Referring to the drawings, and initially to FIGS. 1–5, a keyboard in accordance with the present invention comprises a body or a housing 10 including a number of cavities 11 formed therein and preferably having a non-circular cross section, and formed or defined by such as two pairs of opposite walls 12, 13, to slidably receive a number of key pads 30 therein respectively.

Figure 3:
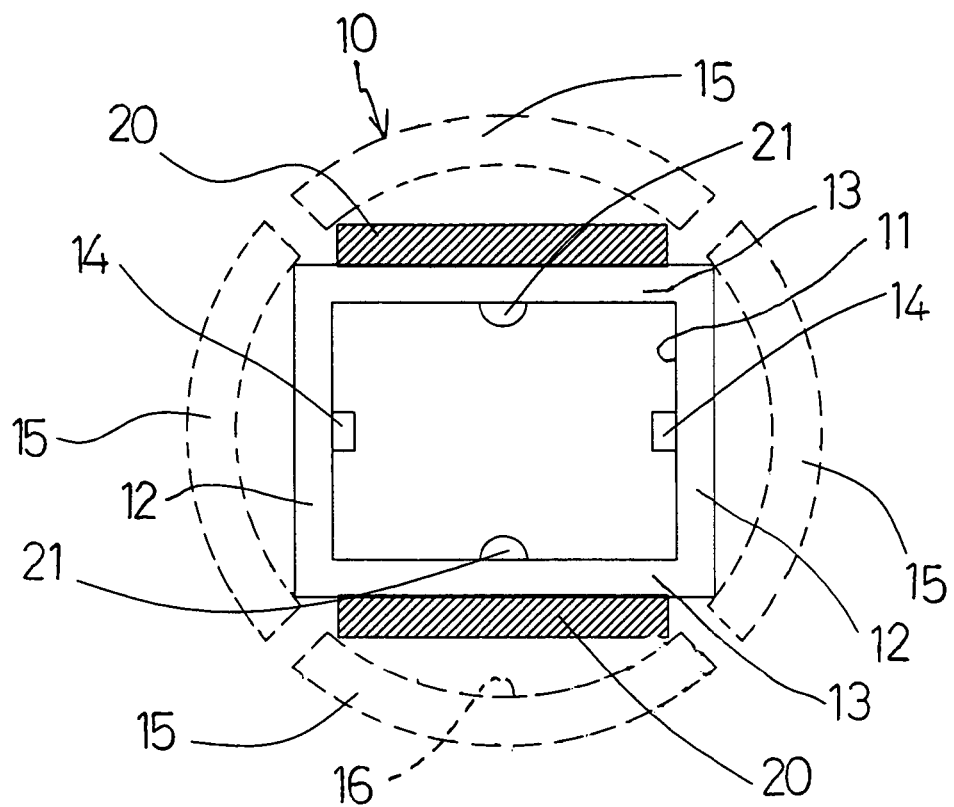
FIG. 3 is a partial top plan schematic view of the keyboard.
Figure 4:
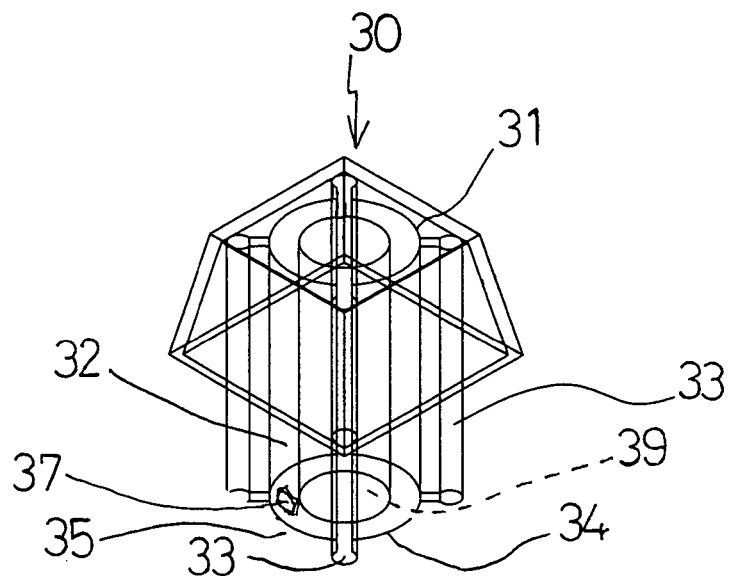
FIG. 4 is an enlarged perspective view illustrating one of the key pads of the keyboard.

It is preferable that the housing 10 includes one or more juts 14 extended into each of the cavities 11 thereof, from such as the walls 12 (FIG. 3), and includes a number of conductors 20 engaged therein. For example, two conductors 20 are attached to each pair of the walls 13 of the housing 10, and each includes a conductive projection 21 extended through the walls 13 and extended into the respective cavities 11 of the housing 10 (FIG. 3). The projections 21 of the conductors 20 are thus preferably offset from the juts 14 for ninety (90) degrees.

The housing 10 includes one or more, such as four fence 15 formed or provided below each of the cavities 11 thereof, to form or define a chamber 16 therein, and to receive a spring biasing member 23 therein. The housing 10 includes a plate 17 attached to the bottom thereof (FIGS. 5, 6), to enclose the chambers 16 of the housing 10, and two membranes 18, 19 received therein and attached to such as the plate 17.

The membranes 18, 19 are typically provided in the conventional keyboards and each includes a number of terminals or conductor points (not shown) to be actuated or to be forced to contact with each other by depressing key pads 30, in order to enter information or controlling signals into computer facilities or the like. The configuration and the operation of the membranes 18, 19 are typically and are not related to the present invention, and thus will not be described in further details.

Figure 5:
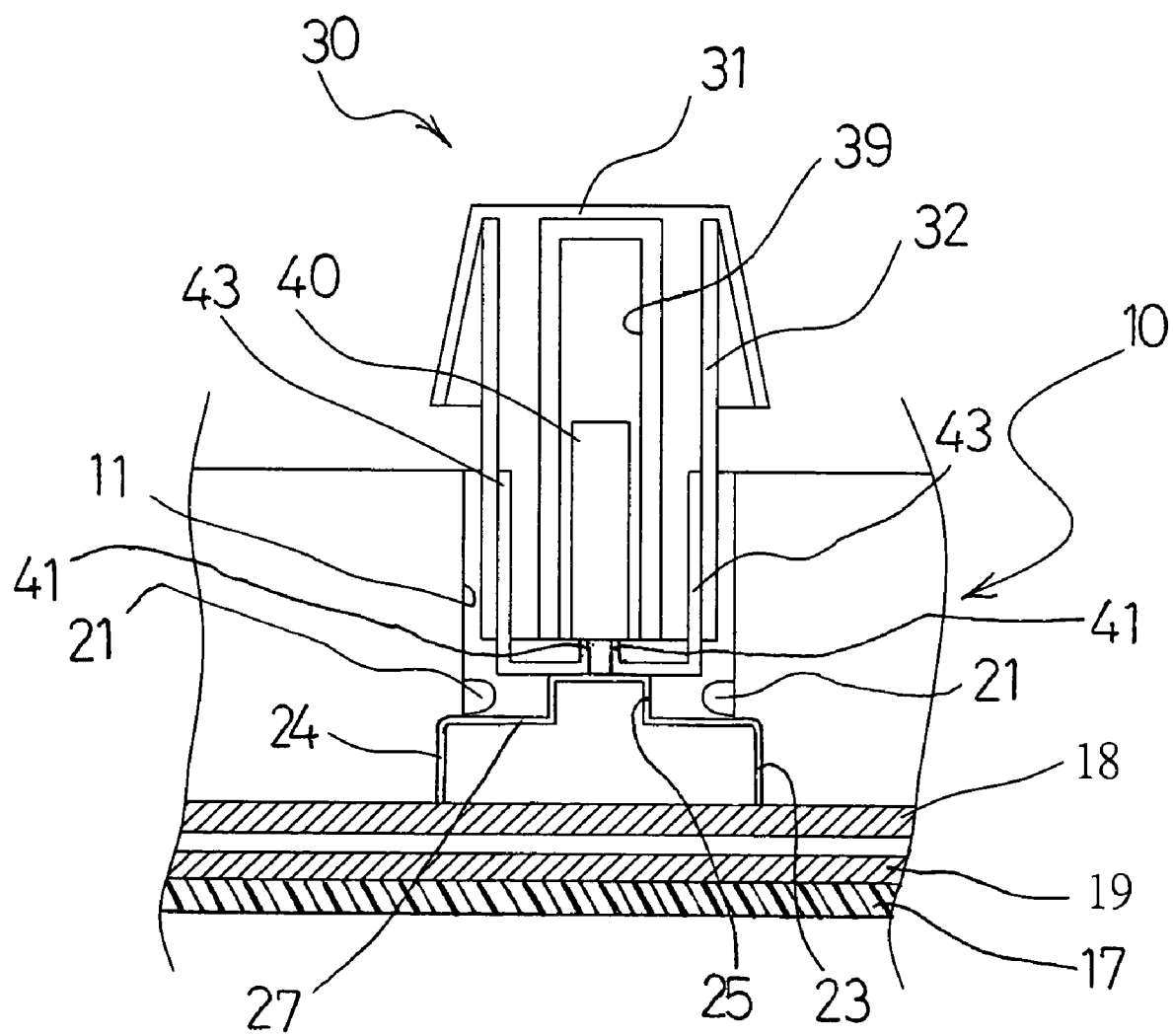
FIG. 5 is a partial cross sectional view of the keyboard, taken along lines 5—5 of FIG. 1.
Figure 6:
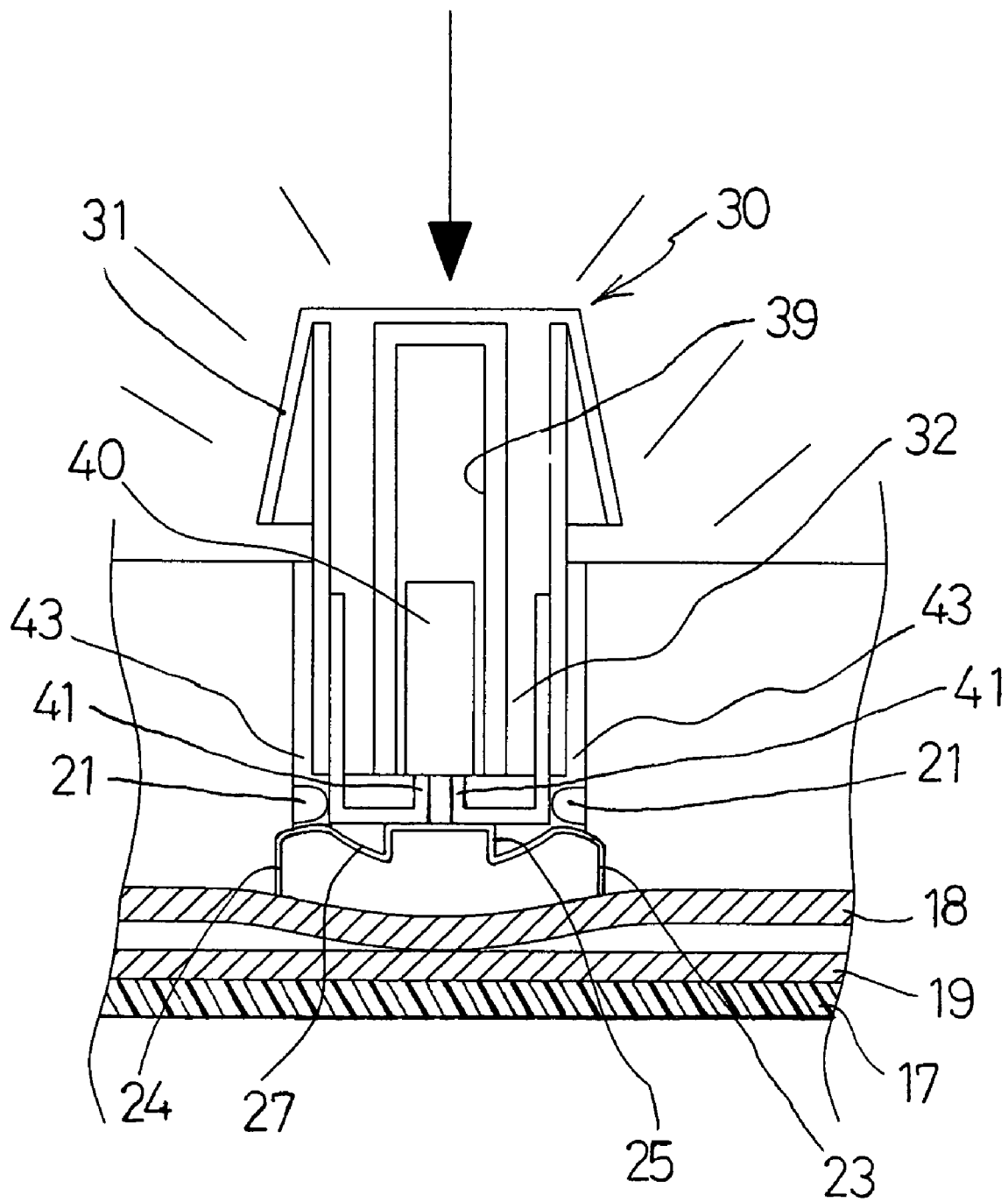
FIG. 6 is a partial cross sectional view similar to FIG. 5, illustrating the operation of the keyboard.

As best shown in FIGS. 5 and 6, the spring biasing members 23 are received in the chambers 16 of the housing 10, and disposed on and aligned with the respective terminals or conductor points (not shown) of the membranes 18, 19, for forcing the terminals or conductor points of the membranes 18, 19 to be contacted with each other when the key pads 30 are actuated or depressed by the users. Each of the spring biasing members 23 includes a peripheral panel 24 engageable onto either of the membranes 18, 19, and a protrusion 25 extended upwardly from an upper panel 27 thereof.

As shown in FIGS. 2 and 4–6, each of the key pads 30 includes a pad member 31, and a shank 32 extended downwardly from the pad member 31 and slidably engaged into the respective cavity 11 of the housing 10, and one or more, such as four ribs 33 extended from the shank 32 to form one or more grooves 34 and one or more channels 35 therein, and to slidably receive the projections 21 of the conductors 20 and the juts 14 of the housing 10 respectively.

The ribs 33 of the key pads 30 may also be used to engage with the walls 12, 13 of the housing 10, and thus to slidably guide the key pads 30 to slide relative to the housing 10, and to prevent the key pads 30 from being rotated relative to the housing 10. Each of the key pads 30 preferably includes one or more stops 37 extended into the channels 35 thereof (FIG. 4), to engage with the respective juts 14 of the housing 10, and to limit the sliding movement of the key pads 30 relative to the housing 10, and to prevent the key pads 30 from being disengaged from the housing 10.

Each of the key pads 30 includes a bore 39 formed therein, such as formed in the shank 32 thereof. A number of light members 40 are engageable into the bores 39 of the key pads 30 respectively, and each includes two terminals 41, and two conductor blades 43 attached to or extended from or coupled to the terminals 41 respectively. The conductor blades 43 may be received in the grooves 34 of the key pads 30 respectively, to selectively engage or contact with the respective projections 21 of the conductors 20 which may electrically couple the light members 40 to and to be energized by electric power sources.

Figure 7:
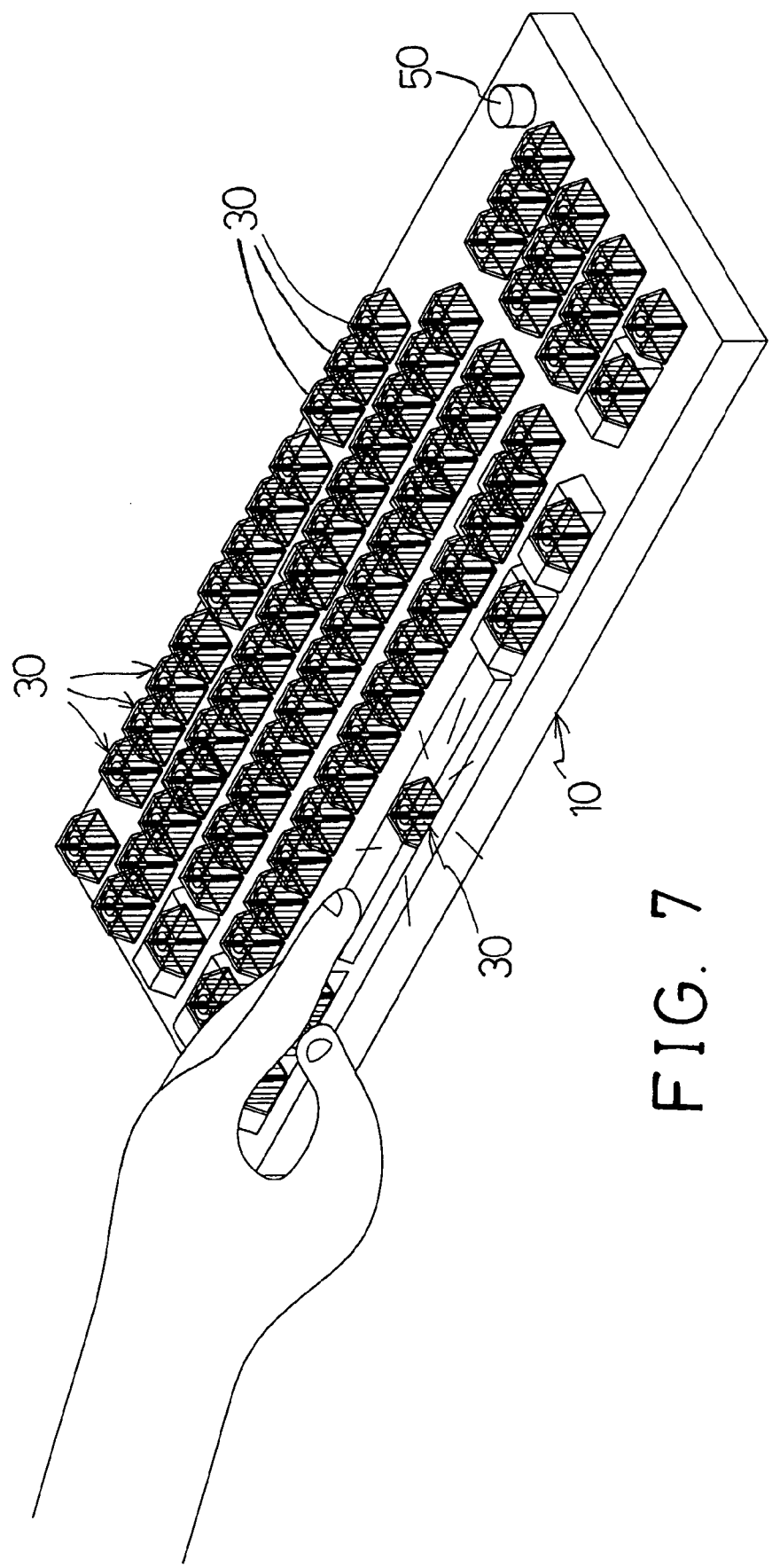
FIG. 7 is a perspective view illustrating the operation of the keyboard.

In operation, as shown in FIGS. 6 and 7, when the key pad 30 is depressed by the users against the spring biasing member 23, the conductor blades 43 the light members 40 may be caused to engage or contact with the respective projections 21 of the conductors 20, to allow the light members 40 to be energized to generate warning or indicating light. It is preferable that the key pads 30 are made of transparent or semi-transparent materials.

When the key pad 30 is released by the users, the spring biasing member 23 may bias the key pad 30 upwardly away from the bottom plate 17 of the housing 10, to disengage the conductor blades 43 the light members 40 from the respective projections 21 of the conductors 20, and thus to turn off the light members 40. The spring biasing member 23 may be engaged with the shank 32 of the key pad 30, or may be engaged with the terminals 41 of the light members 40 if or when the spring biasing member 23 is made of non-conductive materials.

Figure 8:
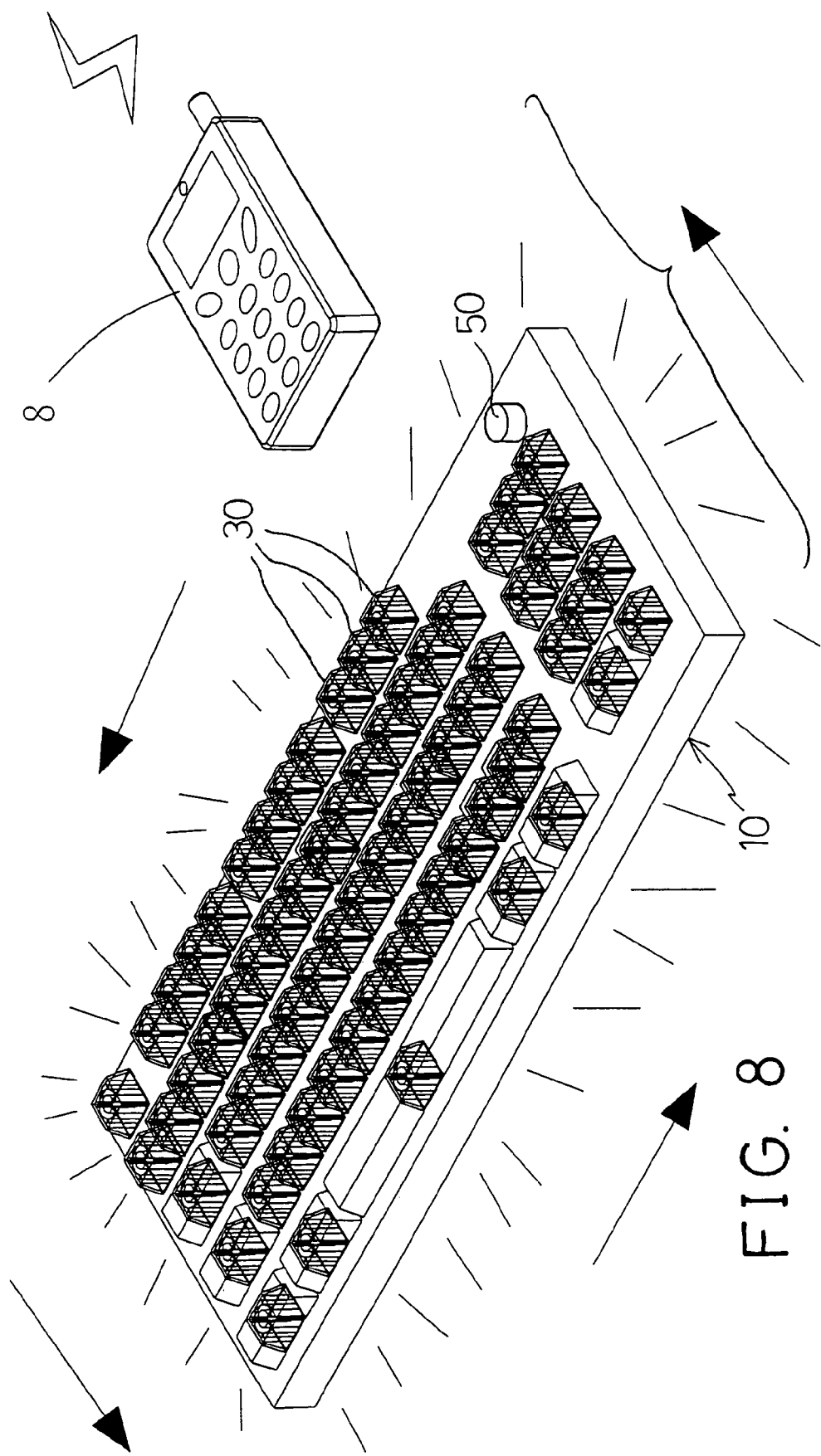
FIG. 8 is an exploded view illustrating an application of the keyboard.

As shown in FIG. 8, the keyboard may include a control circuit (not shown) to control or to switch on the light members 40 by electromagnetic waves generated by such as the portable or mobile phones 8, or to switch on the light members 40 when the portable or mobile phones 8 receive an incoming phone call, or the like.

Figure 9:
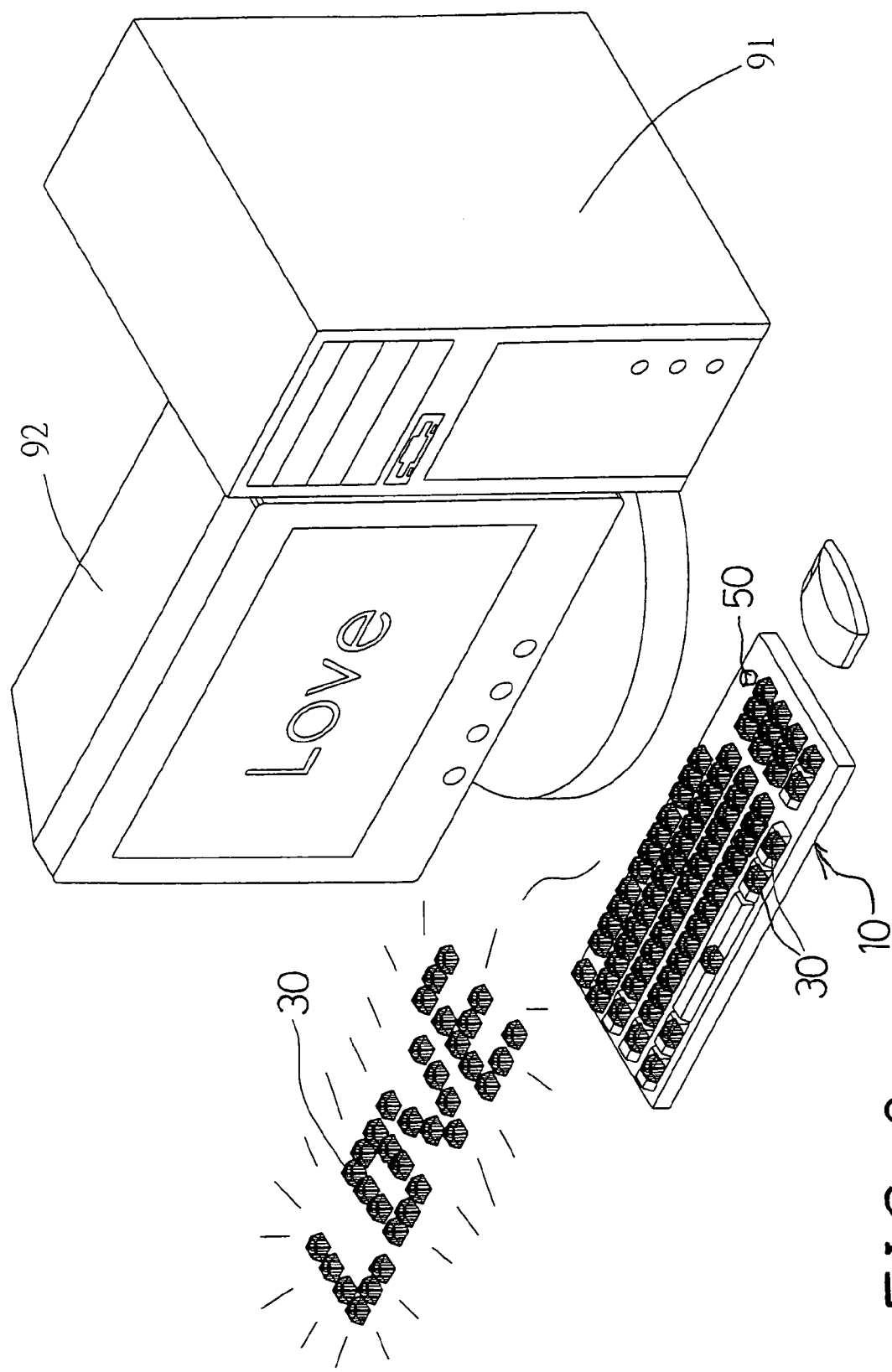
FIG. 9 is an exploded view illustrating the other application of the keyboard.

As shown in FIG. 9, the light members 40 engaged in the key pads 30 of the keyboard may be energized or actuated or operated according to or in response to the words shown in a monitor 92 of a computer facility 91, for example.

Figure 10:
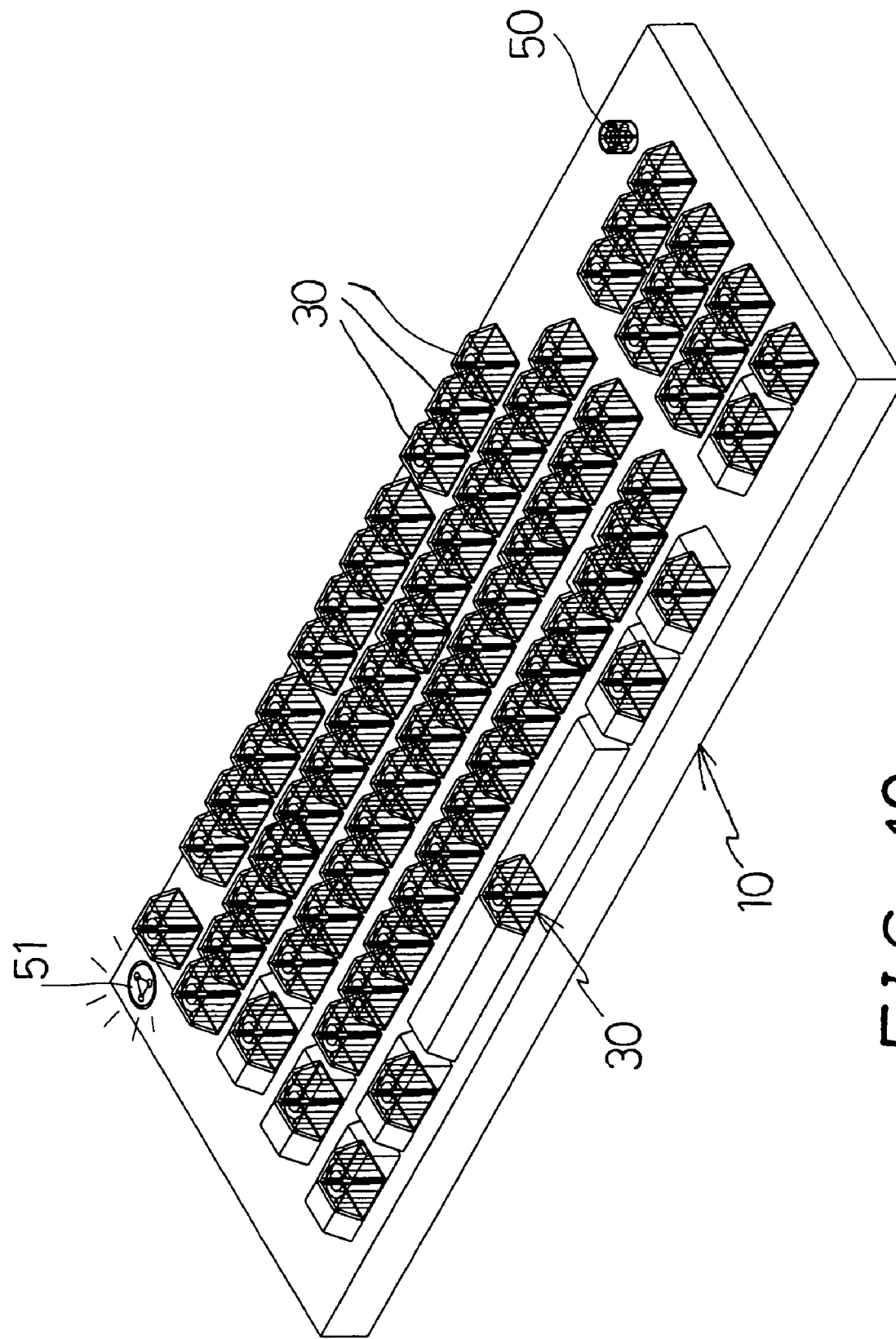
FIG. 10 is a perspective view illustrating the further application of the keyboard.

As shown in FIG. 10, the keyboard may further include a switch 50 provided or disposed on the housing 10, and a pattern 51 provided therein and to be selectively lighted by one of the light members 40 when the switch 50 is depressed or actuated by the users, for such as advertising purposes or marketing purposes or the like.

Accordingly, the keyboard in accordance with the present invention includes a lighting device to indicate the depressions or actuations of key pads of keyboards.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A keyboard comprising: a housing including a plurality of cavities formed therein, a plurality of key pads each including a shank slidably received in said cavities of said housing respectively, and means for lighting said key pads;
   wherein said lighting means includes a plurality of light members engaged in said shanks of said key pads respectively;
   wherein said housing includes two conductive projections extended into each of said cavities thereof respectively, and each of said light members includes two terminals to selectively coupled to said projections of said housing; and
   wherein said housing includes two walls to define each of said cavities thereof, said conductive projections of said conductors are extended through said walls of said housing and extended into each of said cavities of said housing respectively.

2. A keyboard comprising: a housing including a plurality of cavities formed therein, a plurality of key pads each including a shank slidably received in said cavities of said housing respectively, and means for lighting said key pads;
   wherein said lighting means includes a plurality of light members engaged in said shanks of said key pads respectively;
   wherein said housing includes two conductive projections extended into each of said cavities thereof respectively, and each of said light members includes two terminals to selectively coupled to said projections of said housing; and
   wherein each of said key pads includes two grooves formed therein to slidably receive said conductive projections of said conductors respectively.

3. The keyboard as claimed in claim 2, wherein each of said key pads includes a plurality of ribs extended therefrom to define said grooves thereof.

* * * * *